United States Patent [19]
Birecki

[11] Patent Number: 5,189,649
[45] Date of Patent: Feb. 23, 1993

[54] METHOD AND APPARATUS FOR DIRECTLY OVERWRITING MAGNETOOPTIC DATA STORAGE MEDIA

[75] Inventor: Henryk Birecki, Palo Alto, Calif.
[73] Assignee: Hewlett-Packard Company, Palo Alto, Calif.
[21] Appl. No.: 876,693
[22] Filed: Apr. 28, 1992

Related U.S. Application Data

[63] Continuation-in-part of Ser. No. 732,341, Jul. 17, 1991, abandoned, which is a continuation of Ser. No. 356,312, May 24, 1989, abandoned.

[51] Int. Cl.$^5$ .................. G11B 13/04; G11B 11/10
[52] U.S. Cl. ........................ 369/13; 360/59; 365/122
[58] Field of Search ............ 369/13; 360/59, 114, 360/110, 14; 365/122; 367/100

[56] References Cited

U.S. PATENT DOCUMENTS

| | | | |
|---|---|---|---|
| 4,610,009 | 9/1986 | Connell | 360/114 |
| 4,649,519 | 3/1987 | Sun et al. | 365/122 |
| 4,748,525 | 5/1988 | Perlov | 360/110 |
| 4,888,750 | 12/1989 | Kryder et al. | 369/13 |
| 4,914,643 | 4/1990 | Maeda | 360/114 X |
| 4,993,011 | 2/1991 | Torazawa et al. | 369/13 X |
| 5,043,959 | 8/1991 | Minami et al. | 360/114 X |
| 5,043,960 | 8/1991 | Nakao et al. | 360/114 X |

FOREIGN PATENT DOCUMENTS

| | | | |
|---|---|---|---|
| 57-646 | 4/1983 | Japan | 360/114 |

OTHER PUBLICATIONS

IBM Technical Disclosure Bulletin, vol. 29, No. 5, Oct. 1986; "Magneto-Optic Recording Erase Method," p. 2093.
Shieh, Han-Ping & Kryder, Mark, Appl. Physc. Lett 49 (8), 25 Aug. 1986, "Magneto-Optic Recording Materials with Direct Overwrite Capability", pp. 473-474.
IEEE Transactions on Magnetics, Shieh, Han-Ping & Kryder, Mark, vol. Mag.-23, No. 1, Jan. 1987, "Operating Margins for Magneto-Optic Recording Materials with Direct Overwrite Capability", pp. 171-173.
IEEE Transactions on Magnetics, Hartmann, M., Braat, J., Jacobs, B., vol. Mag-20, No. 5, Sep. 1984, "Erasable Magneto-Optical Recording Media", pp. 1013-1018.

*Primary Examiner*—Stuart S. Levy
*Assistant Examiner*—Joseph A. Rhoa

[57] ABSTRACT

An apparatus and method for directly overwriting data on a magnetooptic data storage medium. The apparatus includes a magnet (16) disposed adjacent to a recording medium (14) which provides a static magnetic field which interacts with the medium (14). The interaction is broadbased, having an area including multiple tracks (17) of the medium that encompass up to an entire data band. A first laser focuses a continuous laser beam (22) onto a track (17) of the recording medium within the location of the reversed magnetic field (18). This first laser beam (22) provides for erasure of the medium. A second laser focuses a pulsed laser beam (26) onto the erased track (17) within the location of the nonreversed magnetic field (20). This pulsed laser beam (26) provides for writing to the medium. Typically, the magnetic field provided by the magnet (16) is static, but its orientation changes with the distance along the data tracks (17) in that its component perpendicular to the medium (14) switches direction within the field of view of an optical system employed to focus the laser beams (22,26). The magnet (16) may be stationary, or movable such that it is positionally synchronized with the laser writing operations. The magnetic field may also be offset or contoured to compensate for motion of the medium during cool down subsequent to a writing operation. The method in accordance with the present invention includes the steps of applying a static magnetic field to a magnetooptic recording medium (14) whose magnetic field encompasses up to a full data band; focussing a first laser beam (22) onto a track (17) of the recording medium at the location of the reversed magnetic field (18) to erase the medium; and focussing a second laser beam (26) onto the erased track (17) of the recording medium at the location of the nonreversed magnetic field (20) to write to the medium.

2 Claims, 2 Drawing Sheets

METHOD AND APPARATUS FOR DIRECTLY OVERWRITING MAGNETOOPTIC DATA STORAGE MEDIA

CROSS REFERENCE TO RELATED APPLICATIONS

This is a continuation-in-part of U.S. application Ser. No. 07/732,341, filed Jul. 17, 1991 now abandoned, which is a continuation of U.S. patent application Ser. No. 07/356,312, filed May 24, 1989, now abandoned.

BACKGROUND

The present invention relates generally to magnetooptic storage apparatus and methods, and more particularly to apparatus and methods which provide for direct overwriting of magnetooptic recording media.

Erasable optical memory has the potential of replacing magnetic recording devices in many mass data storage applications. One of the main factors preventing this is the inability of current systems to directly overwrite the recording medium at high data rates. Currently, there are several approaches that are under investigation to overcome the overwriting limitation. These primarily include magnetic field modulation, and a dual magnetic layer medium. Other concepts have been proposed, but are complex media structures which are theoretical in nature or whose characteristics are not well-suited for data recording.

The magnetic field modulation scheme involves the use of a magnetic head in close proximity to the active layers of the magnetooptic medium. The data rate of such a system is limited by the switching characteristics of the coil in the magnetic head. To achieve high rates, the head must be small and be positioned in extremely close proximity to the active layers which creates alignment and reliability problems. This technique is believed to be limited to data rates below 2.5 million bytes per second by practical considerations. The dual magnetic layer medium has been demonstrated, but such structures are difficult to manufacture due to the sensitivity of interface between the active layers to small changes in impurity content at the interface and manufacturing conditions.

Direct overwriting of magnetooptical materials is presented in detail in the following articles and patents: "The Overwriting Characteristics of Magneto-Optical Disk by Magnetic field Modulation Method," by Fujio Tanaka et al, in IEEE Transactions on Magnetics, Vol. 23, pages 2695-2698 (1987); "High-Speed Overwritable Optical Disk," by Masahiro Ojima et al, in SPIE Proceedings, Vol. 899, pages 154-160 (1988); "Magneto-Optic Recording Erase Method," published in the IBM Technical Disclosure Bulletin, Vol. 29, No. 5, page 2093, October 1986; U.S. Pat. No. 4,649,519 entitled "Self Biasing Thermal Magneto-optic Medium"; "Operating Margins for Magneto-Optic Recording Materials with Direct Overwrite Capability," by Han-Ping D. Shieh et al, IEEE Transactions on Magnetics, Vol. MAG-23, Vol. 1, pages 171-173, January 1987; and "Magneto-optic recording materials with direct overwrite capability," by Han-Ping D. Shieh et al, Appl. Phys. Lett. Vol. 49, No. 8, pages 473-474, Aug. 25, 1986.

With reference to the Tanaka et al article, at page 1, column 1, in the third paragraph of the introduction thereof, reference is made to two articles. The first article is entitled "Erasable Magneto-Optical Recording Media," by M. Hartmann et al, in IEEE Transactions on Magnetics, Vol. MAG-21, (1985) at page 1013. The second article is authored by K. Torazawa, et al and may be found at page 231 of the "Digest of Symposium on Optical Memory Japan," (1986) at page 87. With reference to the Hartmann et al article, at page 1017 it discloses a technique of directly overwriting an optical disk. This technique involves the use of a large area magnet whose field overlays a wide area of the optical disk. A first laser beam is employed to erase the optical disk on a first track thereof, while a second laser beam is employed to write to the erased optical disk on an adjacent track of the disk. When writing of the second track is finished, the direction of the magnetic field is switched, the second laser beam is moved to the previously erased track and the first beam is moved to the next track. This technique uses global magnetic field, and the field must be flipped for successive erasing and writing operations. This technique is useful for erasing and writing long files, but does not permit direct overwriting of a random single sector of data.

SUMMARY OF THE INVENTION

In order to overcome the limitations of conventional direct writing apparatus and methods, the present invention provides for apparatus and methods which provide for directly writing on a magnetooptic recording medium that achieves a high speed data rate and which minimizes the moving parts required to perform the direct overwriting operation. For the purposes of this disclosure, the term "direct overwrite" as it is employed herein means that the same optical system is employed to both write and erase while eliminating the need for extra latency between the erase and write cycles.

The system in accordance with the principles of the present invention comprises apparatus which directly overwrites data in a magnetooptic data recording system incorporating a moving magnetooptic recording medium. The system comprises a magnet disposed adjacent to the recording medium which applies a static magnetic field to a large area of the medium. The magnetic field provided by the magnet is static, but its orientation changes with the distance along the data tracks in that is component perpendicular to the medium switches direction within the field of view of an optical system employed to focus the laser beams. The magnetic field strength is such that it has a flux density that is insufficient by itself to alter the data recorded in the recording medium. The magnetic field is positioned to overlay multiple tracks of the recording medium, on the order of from 20-50 tracks, for example, such that the reversed and nonreversed fields overlay the multiple tracks up to a width encompassing an entire data band. A first laser is disposed adjacent to the recording medium and provides a continuous laser beam that is focussed onto the recording medium at the location of the reversed magnetic field. This first laser beam is employed to erase the medium. A second laser is also disposed adjacent to the recording medium and provides a pulsed laser beam that is focussed onto the recording medium at the location of the nonreversed magnetic field. This pulsed laser beam is adapted to write to the medium.

The present system for directly overwriting data onto the recording medium permits the writing of bits and sectors of data along a single track of the medium. The magnetic field employed in the present invention is a static one that overlays many tracks, of which one is currently overwritten. The use of a static magnetic field eliminates the inherent speed limitation of a switched magnetic field, thus permitting higher speed operation.

The recording medium contains an active layer whose magnetic state is affected by the heating effects introduced by the laser beams. The continuous laser beam provided by the first laser heats the active layer at the location of the reversed magnetic field and allows the magnetic dipole elements in the active layer to align in the direction of the reversed magnetic field. The action of the first laser is to write zeros ("0") everywhere. The pulsed laser beam provided by the second laser heats the active layer in the presence of the nonreversed magnetic field to align selected dipole elements in the direction of the nonreversed magnetic field in order to write ones ("1") in selected data locations. Accordingly, the data is erased by the first laser beam and written by the second in accordance with the direction of the applied magnetic field.

The writing data rate of the system is generally limited by the speed of modulating the second laser beam. Consequently a data rate of more than 3 megabytes per second is achievable by the present invention. The erase beam is not pulsed, hence there are no timing problems associated with the present system. The use of a static magnetic field eliminates problems of extreme proximity, small size and power dissipation. The magnet may be made wide enough to extend over a full data band so that the need to move it may also eliminated.

Another significant data rate limitation is caused by the relationship between the medium cool down time, disk velocity and separation between the laser beams. A typical cool down time is 150 nanoseconds. The linear velocity of the disk required for 4 megabytes per second data rate is about 30 meters per second due to the size of the beam. This results in a disk motion of about 4.5 microns during cool down. In order to compensate for this, the magnetic field may be offset or contoured to compensate for motion of the medium during the cool down period. Following this argument, a typical data rate limit of 20-40 megabytes per second is achievable.

The present invention also provides for a method of directly overwriting data in a magnetooptic data recording system incorporating a moving magnetooptic recording medium. The method comprises the steps of applying a static magnetic field having reversed and nonreversed field directions to a predetermined area of the recording medium. The predetermined area corresponds to an area encompassing multiple tracks of the medium and the reversal of field direction takes place within the field of view of the objective lens. The magnetic field has a dimension that is quite large compared with the size of a single track of the recording medium on which data is recorded. The magnetic field has a flux density that is insufficient by itself to alter data recorded in the recording medium. A first continuous laser beam is focussed onto a single track of the recording medium at a location corresponding to the location of the reversed magnetic field. This operation provides for erasure of the medium. A second pulsed laser beam is focussed onto the same track of the recording medium at a location corresponding to the location of the nonreversed magnetic field. This operation provides for writing to the medium. The magnetic field switches direction within the field of view of the device that focuses the laser beams so that writing and erasing operations are accomplished using the same optical system

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
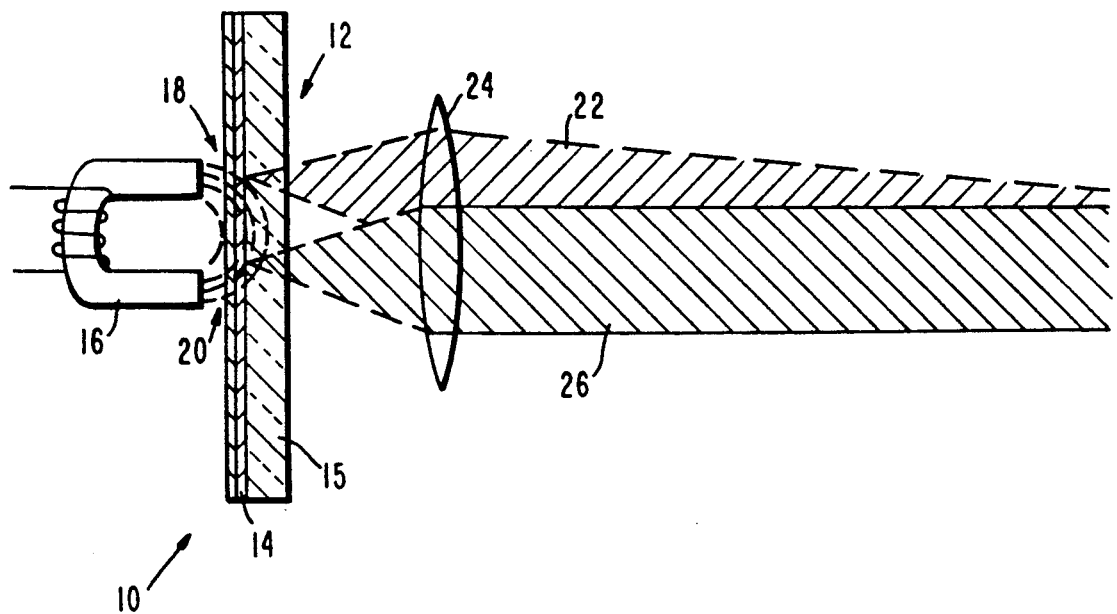
FIGS. 1 and 2 illustrate the system and method of providing for direct overwriting of data in a magnetooptic recording medium in accordance with the principles of the present invention.

Referring to FIG. 1, a cross sectional view of a system 10 which provides for direct overwriting of data in a magnetooptic recording medium in accordance with the principles of the present invention is shown. The system 10 comprises a magnetooptic recording disk 12 which includes an active recording layer 14 that records data as a function of the state of magnetic polarization. A typical recording disk 12 is a 5.25 inch diameter disk having a substrate 15. The substrate 15 is typically glass or polycarbonate or polymethyl methacrylate (PMMA), or the like, as is well-known in the art. The substrate 15 has grooves 17 disposed therein which define the tracks of the disk 12. The grooves 17 are shown more clearly in FIG. 2. The grooves 17 are typically about 0.8 microns wide with a 1.6 micron center to center spacing, and are typically formed by means of a "2P" (photo polymerization) process or injection molding process. Alternatively, tracks can be defined by discontinuous sampling features, as is well-known in the art.

By way of example, a 500-1000 Angstrom layer of silicon nitride ($Si_3N_4$) or silicon oxide (SiO), or the like may be deposited onto the grooved substrate 15 as a protection layer. A dielectric layer comprising zinc selenide (ZnSe) or zinc sulfide (ZnS) may then be deposited on top of the zinc dielectric layer to a thickness of about 500 Angstroms as an antireflection layer. A layer of Terbium Iron Cobalt (TbFeCo), which comprises the active layer 14, is then deposited on top of the zinc selenide or zinc sulfide layer to a thickness of about 1000 Angstroms. Finally a protective layer of silicon nitride ($Si_3N_4$) or silicon oxide (SiO), for example, may then be deposited on top of the active layer 14 to complete the disk structure. Other protective layers and optical structures may also be employed, as is known to those skilled in the art.

A magnet 16 is disposed adjacent to the recording disk 12 such that its magnetic field lines penetrate through the disk 12 and interact with the active layer 14. The magnetic field is disposed such that it interacts with a large number of tracks of the medium, on the order of from 20-50, for example. The magnet 16 provides a static magnetic field, and such a field may be provided by a fixed magnet or an electromagnet, or the like. A typical magnet 16 has a U-shaped configuration with a pole separation of about 20 microns, for example. The fields present at the poles of the magnet 16 have opposite polarity with respect to each other. The field strength of the magnet 16 is such that it is insufficient to affect the polarization state of dipole elements comprising the active layer 14. The magnetic field lines emanating from and entering the poles of the magnet 16 are such that a reversed magnetic field is produced in the area identified by lead line 18, and a nonreversed magnetic field is produced in the area identified by lead line 20. For purposes of this disclosure, the field components perpendicular to the active medium are utilized in the writing, erasing and direct overwriting processes.

In one embodiment, the system 10 incorporates a stationary magnet 16, having a large enough width to completely encompass all tracks of the recording medium. The components comprising the writing and erasing mechanism are movable, which provides for minimal moving mass. In another embodiment, the magnet 16 may be somewhat smaller in size, in which case it would be movable orthogonal to the direction of rotation of the disk 12, namely along a radius of the disk 12. In the latter case, the laser optical system and the magnet 16 would move together depending upon the location of the disk writing.

A first laser (not shown) provides a continuous laser beam 22, that is employed as an erase beam for the system 10. The continuous laser beam 22 is focussed by means of a lens 24, or similar optical focussing system, onto the active layer 14 at the location within the reversed magnetic field 18. The beam is typically focussed to a 1 micron spot size. The lens 24 may have a typical field of view of about 50-100 microns, for example. Similarly, A second laser (not shown) provides a pulsed laser beam 26, that is employed as a write beam for the system 10. The pulsed laser beam 26 is focussed by means of the lens 24 onto the active layer 16 at a location within the nonreversed magnetic field 20.

In operation, the disk 12 rotates past the magnet 16 at a fixed speed, for example. The continuous laser beam 22 heats the active layer 14 at the location of the reversed magnetic field 18 and causes the dipole elements within the active layer 18 to become aligned in the direction of the reversed field. This erases the active medium 14 by creating dipole moments representing zeros ("0"). The medium cools off as it passes from area 18 to area 20. Subsequent to the erasure of the active layer 14, the pulsed laser beam 26 writes ones ("1") in selected locations of the active layer 14 by heating the active layer 14 at the location of the nonreversed magnetic field 20. This causes the dipole elements in the active layer 14 to align themselves with the nonreversed magnetic field.

The phenomenon of writing and erasing the active layer 14 is generally well-known in the art. In the presence of a relatively weak magnetic field that is not strong enough to align the dipole elements in the active layer 14, if the temperature in the active layer 14 is increased above a temperature just below the Curie temperature of the active layer 14, then the dipole elements can be aligned by the weak magnetic field at that location. Both the erasure beam and the writing beam accomplish the orientation of the dipole elements in this manner.

Figure 2:
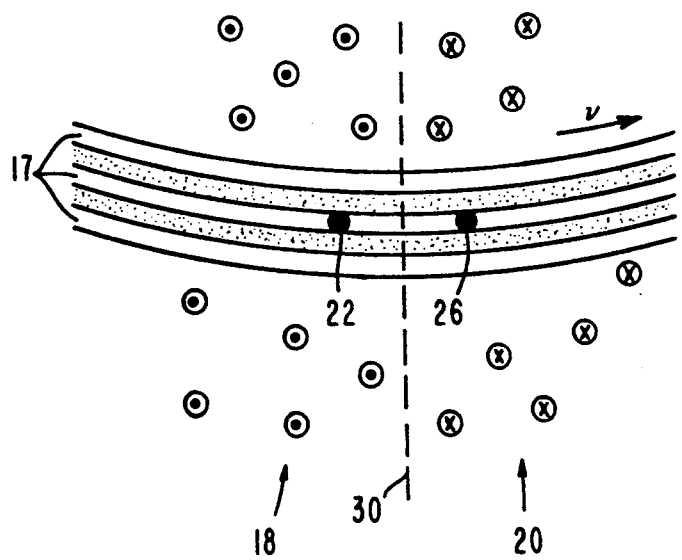
Figure 3:
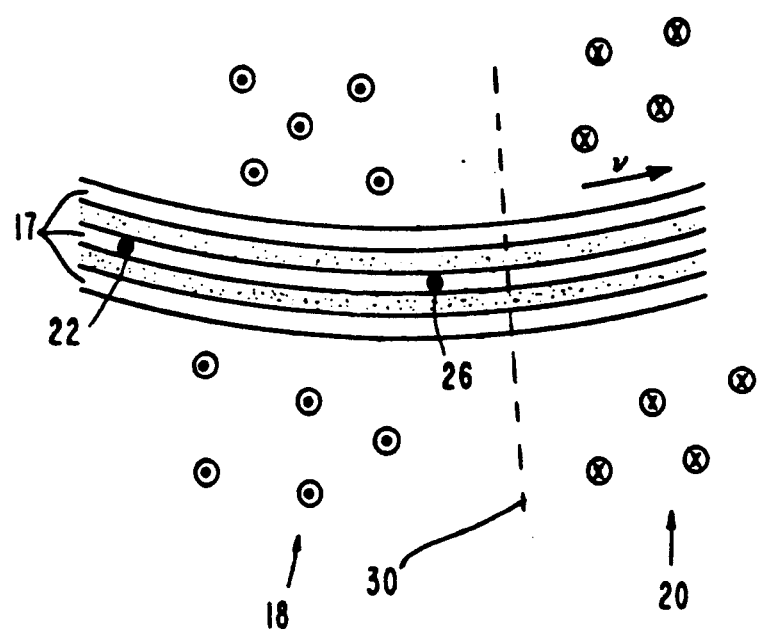
FIG. 3 is a schematic rear view of another embodiment of the system and method for providing direct overwriting in accordance with the present invention.

FIG. 2 shows a top view of the system 10 of FIG. 1. The grooves 17 are shown more clearly therein as well as the relative positioning of the magnetic fields 18, 20 and the focussed laser beams within the area comprising a single data track. The reversed magnetic field 18 is shown as a series of circles having dots in the middle thereof, and whose location is to the left of a field dividing line 30. This indicates that the field lines are leaving the disk. The nonreversed magnetic field 20 is shown as a series of circles having crosses in them. This indicates that the field lines are entering the disk. The location of line 30 can be purposely displaced along the tracks to compensate for the linear velocity of the disk so that the medium enters the area of appropriate field at the time of its cooling down. This displacement of the dividing line 30 is illustrated in FIG. 3, which shows a system that employs all of the elements described above but shows the laser beams 22 and 26 being outside of the magnetic fields 18 and 22. As will be described more fully below, the displacement of the field dividing line 30 such that the laser beams are focussed in the areas where the absolute values of the fields are low or even reversed, so as to allow some cooling to take place prior to entering a magnetic field of an appropriate strength and polarity. This allows an increase in the maximum disk velocity, thereby increasing the data rate limit of the system.

Returning to FIGS. 1 and 2, the writing speed of the system 10 is limited only to the speed at which the pulsed laser beam 26 can be turned on and off. This therefore permits the operational speed of the present invention to reach a desired writing rate of at least 3 megabytes per second. In a second embodiment, the magnet 16 would also move, generally with the laser optical system, in a direction orthogonal to the direction of the rotating disk. This second embodiment would also have a similar writing rate of at least 3 megabytes.

Another significant data rate limitation is caused by the relationship between the medium cool down time, disk velocity and separation between the laser beams. For a given cool down time and a given separation between the laser beams there is a maximum disk velocity since a location on a track 17 that has been heated by the continuous laser beam 22 cannot be allowed to enter the nonreversed magnetic field 20 until that location has cooled sufficiently to prevent the nonreversed magnetic field from undesirably realigning the dipole elements. A typical cool down time is 150 nanoseconds. The linear velocity of the disk required for 4 megabytes per second data rate is about 30 meters per second due to the size of the beam. This results in a disk motion of about 4.5 microns during cool down. The laser beams 22 and 26 have an intensity which raises the medium significantly above the threshold temperature, i.e. Curie temperature, for realignment of the dipole elements, since there is a nonuniformity in the distribution of thermal energy into the medium and since the laser beams have a nonuniformity across the diameter of the beams. In order to compensate for this, the magnetic field may be offset or contoured to compensate for motion of the medium during the cool down period, as shown in the embodiment of FIG. 3. In this embodiment partial cooling will occur as the medium travels from the continuous laser beam 22 to the reversed magnetic field 18 and from the pulse laser beam 26 to the nonreversed magnetic field 20, but the temperature will remain above the threshold temperature. This reduces the degree of cooling that must subsequently occur. Thus, the maximum disk velocity is increased. Following this argument, a typical data rate limit of 20-40 megabytes per second is achievable.

The present invention also provides for a method of directly overwriting data in a magnetooptic data recording system 10 incorporating the moving magnetooptic disk 12. The method comprises the steps of applying a static magnetic field having reversed and nonreversed field directions to a predetermined area of the disk 12. The predetermined area corresponds to read and write areas encompassing multiple tracks of the disk 12 and the reversal of field direction takes place within the field of view of the objective lens. The magnetic field has a dimension that is relatively large (20–50 tracks, for example) compared with a single track of the disk 12 on which data is recorded. The magnetic field has a flux density that is insufficient by itself to alter data recorded in the active recording layer 14. A first continuous laser beam is focussed onto an area of a single track of the disk 12 at a location corresponding to the location of the reversed magnetic field 18. This operation provides for erasure of the disk 12. A second pulsed laser beam is focussed onto the track at a location corresponding to the location of the nonreversed magnetic field 20. This operation provides for writing to the disk 12. The magnetic field switches direction within the field of view of the device that focuses the laser beams so that writing and erasing operations are accomplished using the same optical system.

The present system and method permits direct overwriting of data at a high data rate. The use of a static magnetic field eliminates the need for a switched magnetic field, thus permitting higher speed operation. The writing data rate of the system is limited in practice only by the speed of modulating the second laser beam. Consequently, a data rate above 3 megabytes per second is achievable by the present invention. The erase beam is not pulsed, hence there are no timing problems associated with the present system. The use of a static magnetic field eliminates problems of extreme proximity, small size and power dissipation characteristic of the magnetic field modulation method while eliminating the need for extra latency required in presently used mechanisms. The magnet can be made wide enough to extend over a full data band so that the need to move it is also eliminated.

Thus there has been described a new and improved magnetooptic storage apparatus and methods, and more particularly to apparatus and methods which provide for direct overwriting of magnetooptic recording media which achieves a full data rate. It is to be understood that the above-described apparatus and method is merely illustrative of some of the many specific embodiments which represent applications of the principles of the present invention. Clearly, numerous and other arrangements can be readily devised by those skilled in the art without departing from the scope of the invention.

What is claimed is:

1. A method of directly overwriting data in a magnetooptic data recording system incorporating a moving magnetooptic recording medium, said method comprising the steps of:

applying static first and second directionally opposed magnetic fields to predetermined areas of the recording medium that correspond to multiple tracks of the recording medium, which magnetic fields each has a flux density that is insufficient by itself to alter data recorded in the recording medium;

erasing data from the recording medium during direct overwriting operations by exposing the recording medium to heat and the first magnetic field, including constantly focussing a continuous laser beam onto a single track of the recording medium at a location of the recording medium offset from the first magnetic field such that the track enters the first magnetic field during cooling down from exposure to said continuous laser beam, thereby providing an erased track; and writing data onto the erased track during the direct overwriting operations by exposing the erased track to heat and the second magnetic field, including intermittently focussing a pulsed laser beam onto the erased track of the recording medium at a location of the recording medium offset from the second magnetic field such that the erased track enters the second magnetic field during cooling down from exposure to the pulsed laser beam;

whereby a particular location on the recording medium is moved through a sequence of exposure to the continuous laser beam, partial cooling, erasure by said first magnetic field, selective exposure to said pulsed laser beam, partial cooling, and writing by said second magnetic field.

2. A system which directly overwrites data in a magnetooptic data recording system incorporating a moving magnetooptic recording medium, said system comprising:

magnet means having a field dimension that encompasses multiple tracks of the recording medium disposed adjacent to the recording medium, for providing a static magnetic field having first and second opposed magnetic field directions to predetermined areas of the recording medium such that the reversed and nonreversed fields are within a field of view of a single optical focussing system, and which magnetic field has a flux density that is insufficient by itself to alter data recorded in the recording medium, and wherein said magnet means is configured such that its respective reversed and nonreversed magnetic fields are offset with respect to applied continuous and pulsed laser beams on the recording medium to compensate for linear velocity of the recording medium;

first laser means disposed adjacent to the recording medium for constantly focussing a continuous laser beam onto a single track of the recording medium using the optical focussing system at a first location offset from the predetermined area associated with the first magnetic field direction in order to erase the single track of the recording medium during direct overwriting operations; and second laser means disposed adjacent to the recording medium for intermittently focussing a pulsed laser beam onto an erased track of the recording medium using the optical focussing system at a second location offset from the predetermined area associated with the second magnetic field in order to write onto the erased track;

the offsetting of said first and second locations relative to the predetermined areas each being by a distance that allows cooling of the recording medium but which maintains the recording medium above a threshold temperature for erasing and the writing during said direct overwriting operations.

* * * * *